US009977172B2

(12) United States Patent
Gong et al.

(10) Patent No.: US 9,977,172 B2
(45) Date of Patent: May 22, 2018

(54) LIGHT GUIDE PLATE AND DISPLAY DEVICE

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventors: Nuowei Gong, Beijing (CN); Boran Zheng, Beijing (CN); Shanfei Xu, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

( * ) Notice: Subject to any disclaimer, the term of this patent is extended or adjusted under 35 U.S.C. 154(b) by 179 days.

(21) Appl. No.: 14/906,112

(22) PCT Filed: Aug. 21, 2015

(86) PCT No.: PCT/CN2015/087814
§ 371 (c)(1),
(2) Date: Jan. 19, 2016

(87) PCT Pub. No.: WO2016/110106
PCT Pub. Date: Jul. 14, 2016

(65) Prior Publication Data
US 2016/0327726 A1    Nov. 10, 2016

(30) Foreign Application Priority Data

Jan. 6, 2015    (CN) .......................... 2015 1 0005708

(51) Int. Cl.
*G02B 6/00*    (2006.01)
*F21V 8/00*    (2006.01)

(52) U.S. Cl.
CPC ............. *G02B 6/0043* (2013.01); *G02B 6/00* (2013.01); *G02B 6/0036* (2013.01); *G02B 6/0061* (2013.01)

(58) Field of Classification Search
CPC .. G02B 6/0043; G02B 6/0061; G02B 6/0036; G02B 6/004; G02B 6/0045
See application file for complete search history.

(56) References Cited

U.S. PATENT DOCUMENTS

2004/0155995 A1    8/2004    Yu et al.
2004/0212984 A1    10/2004    Chen
(Continued)

FOREIGN PATENT DOCUMENTS

CN    101261338 A    9/2008
CN    102879855 A    1/2013
(Continued)

OTHER PUBLICATIONS

International Search Report and Written Opinion both dated Nov. 11, 2015; PCT/CN2015/087814.
(Continued)

*Primary Examiner* — Karabi Guharay
(74) *Attorney, Agent, or Firm* — Ladas & Parry LLP (57) ABSTRACT

A light guide plate (LGP) and a display device are disclosed. The LGP comprises at least one mesh point; each mesh point is provided with a plurality of microstructures; and all the microstructures on each mesh point are arranged on the same curved surface. The LGP can solve the problem that incident light is subjected to total reflection in the LGP so that the luminous uniformity of the LGP can be improved.

12 Claims, 5 Drawing Sheets

(56) References Cited

U.S. PATENT DOCUMENTS

| | | |
|---|---|---|
| 2008/0130319 A1 | 6/2008 | Hsung et al. |
| 2008/0219026 A1 | 9/2008 | Zhu |
| 2013/0120474 A1* | 5/2013 | Suzuki ................ G02B 6/0036 345/690 |
| 2013/0163281 A1 | 6/2013 | Wang |
| 2013/0215639 A1 | 8/2013 | Lin et al. |

FOREIGN PATENT DOCUMENTS

| | | |
|---|---|---|
| CN | 103246007 A | 8/2013 |
| CN | 103574306 A | 2/2014 |
| CN | 203600605 U | 5/2014 |
| CN | 104536080 A | 4/2015 |
| TW | 200411230 A | 7/2004 |
| TW | 200422671 A | 11/2004 |
| TW | 200530632 A | 9/2005 |
| TW | 201326924 A | 7/2013 |

OTHER PUBLICATIONS

First Chinese Office Action dated May 4, 2016: Appln. No. 201510005706.0.

* cited by examiner

LIGHT GUIDE PLATE AND DISPLAY DEVICE

TECHNICAL FIELD

Embodiments of the present disclosure relate to a light guide plate and a display device.

BACKGROUND

With the rapid development of display technologies, liquid crystal displays (LCDs), as flat-panel display, become more and more widely applied in high-performance display fields due to the characteristics of small volume, low power consumption, non-radiation, low manufacturing cost, etc.

An LCD is a passive luminescent device and requires a backlight unit (BLU) to provide a light source for the LCD, so that the LCD can display images. The BLU may include a light source and a light guide plate (LGP); the light source is disposed facing an incident surface of the LGP; and the LGP is configured to guide the transmission direction of light beams emitted from the light source and convert a line or point light source into a surface light source. The LGP is a key component of the BLU, has the main function of reasonably guiding the scattering direction of light, and hence provides the surface light source with high brightness and good uniformity for an LCD panel.

SUMMARY

Embodiments of the present disclosure provide a light guide plate, which comprises at least one mesh point provided with microstructures, wherein all the microstructures on each mesh point are arranged on the same curved surface.

Optionally, the curved surface is a spherical curved surface.

Optionally, a top surface of the microstructure is a cambered surface.

Optionally, the microstructures, arranged on the same circumference, on the curved surface have a same shape and size; and a plane provided with the circumference is parallel to a light-emitting surface of the LGP.

Optionally, the curved surface is bisected by N parabolas; a starting point of the parabola is a vertex of the curved surface, and an end point is disposed on a bottom surface of the mesh point; N≥1; and the microstructures are sequentially arranged from the starting point to the end point of the parabola and have same shape and sequentially ascending size.

Optionally, the shape of the bottom surfaces of the microstructures includes quadrangle, pentagon or hexagon.

Optionally, the position of the microstructure on the parabola satisfies the formula:

$$\left[1 + \frac{P}{y_{(i)}}(1 - \Delta\varphi^2)\right]\Delta z_{(i+1)}^2 - 2P\Delta z_{(i+1)} - y_{(i)}^2\Delta\varphi^2 = 0$$

wherein P is twice larger than a focal length of the parabola; y(i) is the coordinate of the microstructure in the y direction in the coordinate system of the parabola; $\Delta z_{(i+1)}$ is the distance between centerlines of two adjacent microstructures along the z direction in the coordinate system of the parabola; and $\Delta\varphi$ is an included angle between the centerlines of the two adjacent microstructures on the parabola.

Optionally, the inclination angle $\alpha_{(i)}$ of the microstructure on the parabola satisfies the formula:

$$\alpha_{(i)} = \tan^{-1}\frac{P}{y_{(i)}}.$$

Optionally, the magnification ratio $\beta_{(i)}$ of the two adjacent microstructures satisfies the formula:

$$\beta_{(i)} = \frac{\Delta l_{z(i+1)}}{\Delta l_{\varphi(i)}}$$

wherein $\Delta l_{z(i+1)}$ is the length of the parabola between the centerlines of the two adjacent microstructures along the z direction in the coordinate system of the parabola; and $\Delta l_{\varphi(i)}$ is the diameter of the bottom surface of each microstructure.

Optionally, the curved surface is recessed in the LGP or projected out of the LGP.

Optionally, the spherical curved surfaces of all the mesh points on the LGP have same curvature radius.

The embodiment of the present disclosure further provides a display device, which comprises any foregoing LGP.

BRIEF DESCRIPTION OF THE DRAWINGS

Simple description will be given below to the accompanying drawings of the embodiments to provide a more clear understanding of the technical proposals of the embodiments of the present disclosure. Obviously, the drawings described below only involve some embodiments of the present disclosure but are not intended to limit the present disclosure.

REFERENCE NUMERALS OF THE ACCOMPANYING DRAWINGS

10—LGP; A—Reflecting surface of LGP; B—Light-emitting surface of LGP; 101—Mesh Points; 100—Bottom surface of Mesh Point; 201—Microstructure; 202—Top Surface of Microstructure; 203—Bottom Surface of Microstructure; L1, L2—Circumference of Cross-section of Spherical Curved Surface; o'—Vertex of Spherical Curved Surface; o—Low End of Spherical Curved Surface (Original Point of Coordinate System of Parabola); P—Parabola;

30—Side-lit Light Source; 301—Portion of light-emitting surface of LGP Close to Side-lit Light Source; 302—Portion of Reflecting Surface of LGP away from Side-lit Light Source.

DETAILED DESCRIPTION

For more clear understanding of the objectives, technical proposals and advantages of the embodiments of the present disclosure, clear and complete description will be given below to the technical proposals of the embodiments of the present disclosure with reference to the accompanying drawings of the embodiments of the present disclosure. Obviously, the preferred embodiments are only partial embodiments of the present disclosure but not all the embodiments. All the other embodiments obtained by those skilled in the art without creative efforts on the basis of the embodiments of the present disclosure illustrated shall fall within the scope of protection of the present disclosure.

Figure 1A:
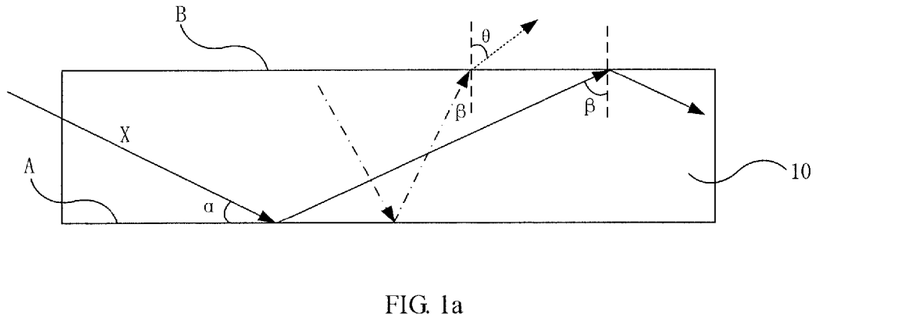
FIG. 1a is a schematic diagram illustrating a light propagation path in an LGP.
Figure 1B:
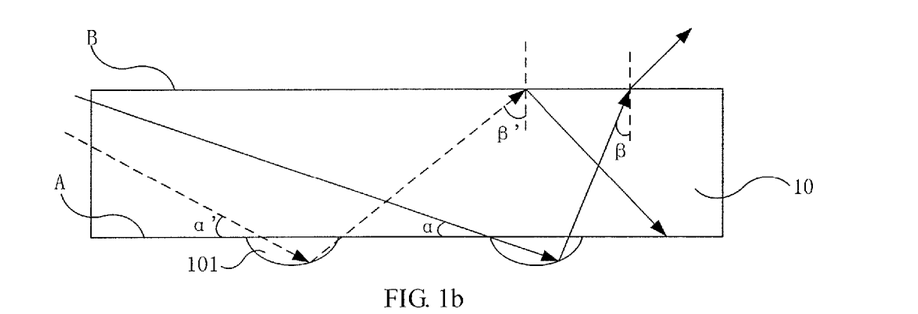
FIG. 1b is a schematic diagram illustrating the light propagation path in another LGP.
Figure 1C:
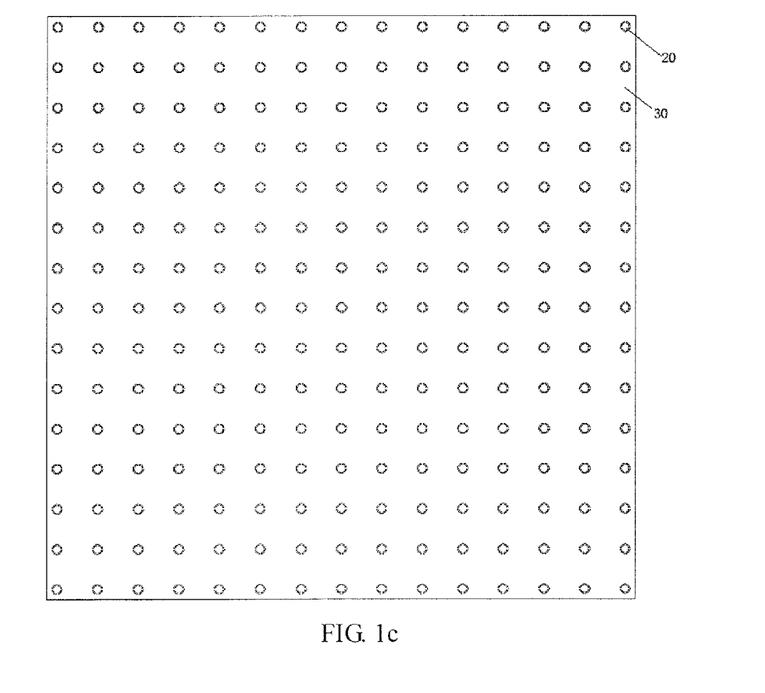
FIG. 1c is a bottom view of the LGP as shown in FIG. 1b.

FIG. 1a is a schematic diagram illustrating the light propagation path in an LGP; FIG. 1b is a schematic diagram illustrating the light propagation path in another LGP; and FIG. 1c is a bottom view of the LGP as shown in FIG. 1b. As illustrated in FIG. 1a, as an included angle α between incident light X entering an LGP 10 and a reflecting surface A of the LGP 10 is large, after the incident light X is reflected on the reflecting surface A an incidence angle β of the incident light X on a light-emitting surface B of the LGP 10 is large. As the incidence angle β of the light on the light-emitting surface B is less than a refraction angle θ, the refraction angle θ is larger when the incidence angle β is larger. When the incidence angle β is greater than a critical value (as shown by solid arrows in FIG. 1), the refraction angle θ is 90°. In this way, the light incident to the light-emitting surface B cannot be emitted from the LGP and is reflected to the LGP 10, namely the light is subjected to total reflection on the light-emitting surface B of the LGP 10.

In order to reduce the total reflection phenomenon on the light-emitting surface B of the LGP 10, as illustrated in FIG. 1b, mesh points 101 are formed on the reflecting surface A of the LGP; and as illustrated in FIG. 1c, the mesh points 101 are, for instance, regularly formed on a bottom surface of the LGP and are in a mesh pattern as a whole. The light in the LGP 10 is irradiated to the mesh points 101 and reflected to the light-emitting surface B of the LGP 10. As the surface of the mesh point 101 for reflection is a curved surface, the curved surface will reduce the incidence angle β of the reflected light on the light-emitting surface B of the LGP 10, so that the light can be emitted from the light-emitting surface B of the LGP 10, and hence the total reflection phenomenon on the light-emitting surface B of the LGP 10 can be reduced.

However, for the purpose of convenience of processing, the curved surfaces of all the mesh points 101 on the reflecting surface A of the LGP 10 have same curvature ratio, but the included angle α between the light irradiated to different mesh points 101 and the reflecting surface A of the LGP 10 is different. As illustrated in FIG. 1b, the included angle α' of the light represented by the dashed line is greater than the included angle α of the light represented by the solid line. Therefore, after the light represented by the dashed line is reflected by the mesh point 101, the incidence angle β' of the light on the light-emitting surface B of the LGP 10 is large, so that the light cannot be emitted from the light-emitting surface B of the LGP, and hence the total reflection phenomenon still occurs. After the light represented by the solid line is reflected by the mesh point 101, the incidence angle β of the light on the light-emitting surface B of the LGP 10 is small, so that the light can be emitted from the light-emitting surface B of the LGP. In this way, a portion of the light-emitting surface B of the LGP 10, from which the light can be emitted, has high brightness, so that the portion from which the light cannot be emitted has low brightness, and hence the luminous uniformity of the LGP can be reduced. Moreover, obvious intense and weak light areas will be presented on the display panel. As intense light and weak light are staggered, the luminous phenomenon of flickering like fireflies will occur. The firefly phenomenon will disadvantageously affect the display effect of the display and reduce the performances of the display.

Figure 2A:
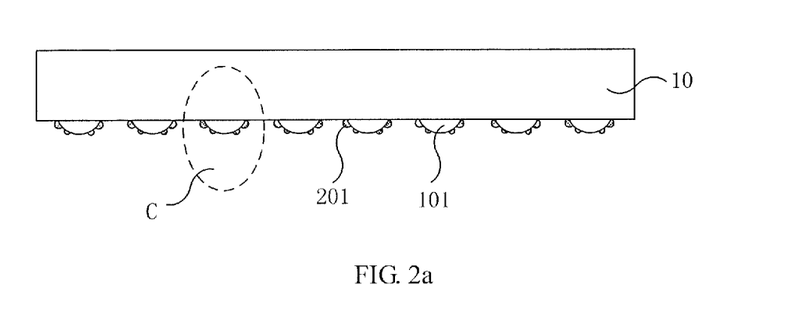
FIG. 2a is a schematic structural view of an LGP provided by an embodiment of the present disclosure.
Figure 2B:
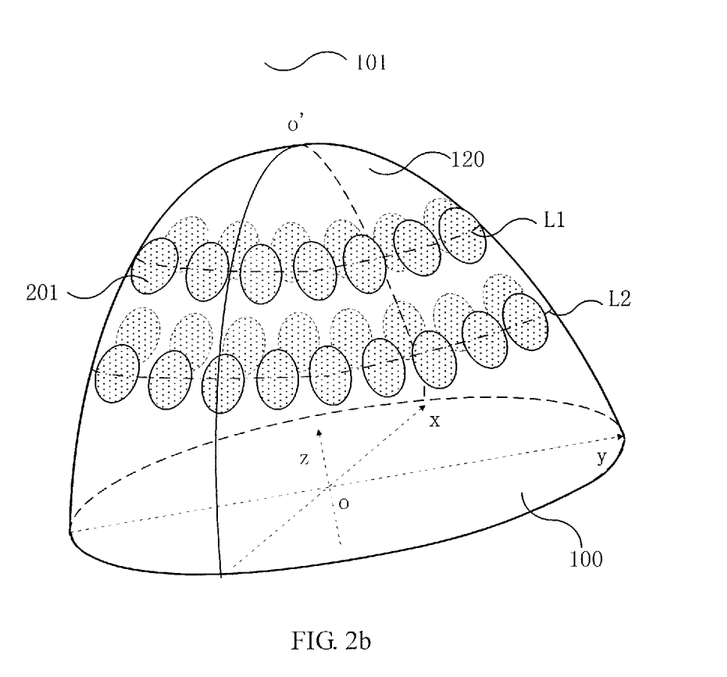
FIG. 2b is a schematic structural view of a mesh point provided by the embodiment of the present disclosure.

An embodiment of the present disclosure provides an LGP 10, which, as illustrated in FIG. 2a, may comprise at least one mesh point 101 provided with microstructures 201. Mesh points 101 may be regularly distributed on a surface of the LGP, for instance, uniformly distributed as shown in FIG. 1c, and may also be, for instance, sparsely distributed in the middle portion and densely distributed on the circumference portion. At least one mesh point is provided with the microstructures, namely not all the mesh points are required to have the microstructures. As illustrated in FIG. 2b, all the microstructures 201 on each mesh point 101 are arranged on the same curved surface 120 of the mesh point 101. The curved surface 120 is a projected outer surface of the mesh point 101.

Figure 2C:
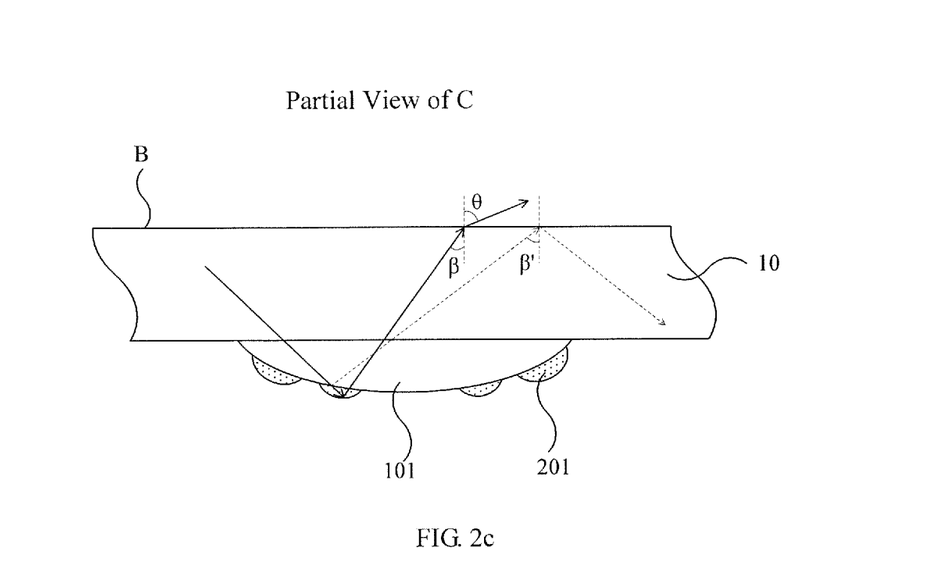
FIG. 2c is a schematic structural partial view of the LGP provided by an embodiment of the present disclosure.

As seen from FIG. 2c, namely the partial view of C in FIG. 2a, the incidence angle β of the light irradiated to the microstructure 201 (represented by the solid line) on the light-emitting surface B of the LGP 10 after reflection is less than the incidence angle β' of the light not irradiated to the microstructure 201 (represented by the dashed line) on the light-emitting surface B of the LGP 10 after reflection. Therefore, the light reflected to the light-emitting surface B of the LGP 10 can be refracted via the microstructure 201 and hence emitted from the LGP 10. Moreover, as the number of the microstructures 201 is larger, the number of the light capable of changing the light propagation path in the LGP 10 is larger, so that the luminous efficiency of the LGP 10 can be more effectively improved.

An embodiment of the present disclosure provides an LGP, which may comprise at least one mesh point provided with microstructures. All the microstructures on each mesh point are arranged on the same curved surface. In this way, when light is irradiated to the mesh point, the curvature of a light contact position on the curved surface of the mesh point may be increased via the microstructures, so that the incidence angle of the light, reflected on the microstructures, on a light-emitting surface of the LGP can be reduced, and hence the light can be emitted from the LGP. Therefore, the total reflection phenomenon of a portion of light required to be refracted that occurs due to the small included angle between the reflected light and the LGP can be avoided; the luminous efficiency of the light on the light-emitting surface of the LGP can be improved; and hence the luminous uniformity and the display effect can be improved.

It should be noted that: firstly, the curved surface 120 may have a regular curvature distribution shape or an irregular curvature distribution shape. No limitation will be placed in this regard in the present disclosure.

In the process of manufacturing the LGP 10, a drill bit is usually adopted to hit an LGP motherboard to form a mesh point model, and subsequently a material layer for forming the LGP 10 is formed on the motherboard. As a result, partial material layer will flow into or bypass the mesh point model so as to form the curved surface 120 projected out of the LGP 10 or recessed in the LGP 10.

In the actual manufacturing process, for the convenience of processing, for instance, the drill bit is generally spherical, so the curved surface obtained by the above manufacturing method is a spherical curved surface with regular curvature distribution.

For instance, the spherical curved surfaces of all the mesh points 101 on the LGP 10 have a same curvature radius. In this way, the mesh points on the LGP 10 can be formed by a uniform manufacturing process, and hence the manufacturing process can be simplified and the manufacturing difficulty can be reduced.

Secondly, the shapes of the top surfaces 202 of the microstructures 201 and the bottom surfaces 203 of the microstructures 201 are not limited.

In order to simplify the manufacturing process, in the process of manufacturing the mesh points provided with the microstructures 201, the drill bit may be slightly ground, so that the surfaces of the mesh points can be rough, and hence the microstructures 201 can be formed. Therefore, in the grinding process, a surface of a portion of the drill bit for forming the microstructure 201 is ground into a cambered surface. Thus, as illustrated in FIG. 2d, the top surface 202 of the formed microstructure 201 may be a cambered surface.

Figure 2D:
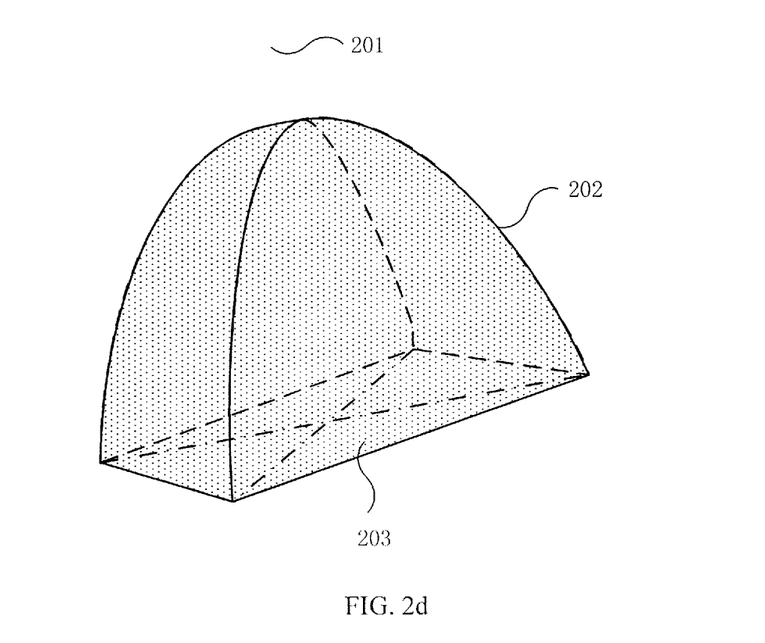
FIG. 2d is a schematic structural view of a microstructure provided by an embodiment of the present disclosure.

The bottom surface 203 of the microstructure 201 may be manufactured into a regular shape according to the processing difficulty and the actual need, e.g., quadrangle as shown in FIG. 2d, or other polygons such as pentagon and hexagon. Or the bottom surface 203 of the microstructure 201 may also be circular. Of course, the bottom surface 203 may also be manufactured into other irregular shapes.

Thirdly, the distribution rule of the mesh points 101 on the LGP 10 is not limited in the present disclosure and may be set according to actual needs.

Figure 2E:
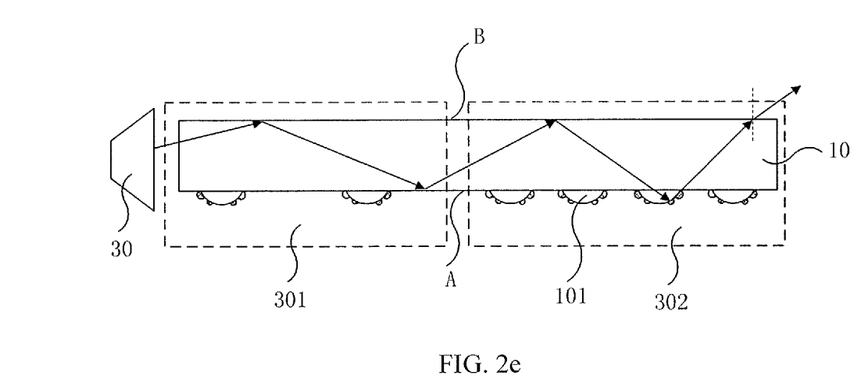
FIG. 2e is a schematic structural view of another LGP provided by an embodiment of the present disclosure.

For instance, as illustrated in FIG. 2e, as for a side-lit backlight, as a side-lit light source 30 is disposed on one side of the LGP 10, incident light on a portion 301 of the light-emitting surface B of the LGP 10 close to the side-lit light source 30 must be led into the other side of the LGP 10 through total reflection of the light on the light-emitting surface B. Therefore, a few mesh points 101 may be formed on a portion 301 of the reflecting surface A of the LGP 10 close to the side-lit light source 30, so that the partial total reflection phenomenon of the light-emitting surface B can be retained, and hence the totally reflected light can be further transmitted towards the other side of the LGP 10. A portion 302 of the reflecting surface A of the LGP 10 away from the side-lit light source 30 may be provided with a plurality of mesh points 101, so that the total reflection phenomenon of the portion on the light-emitting surface B of the LGP 10 away from the side-lit light source can be reduced, and hence the light output rate of the light-emitting surface B of the LGP 10 can be improved.

Moreover, for instance, as for a direct-lit backlight, as the light source is disposed on one side of the reflecting surface A of the LGP, light emitted from the light source can simultaneously enter the LGP 10. Thus, the mesh points 101 may be uniformly distributed on the reflecting surface A of the LGP 10, as long as the mesh points 101 provided with the microstructures are disposed at positions at which total reflection is required to be reduced so that the total reflection phenomenon of the part of light required to be refracted that occurs due to the small included angle between the reflected light and the LGP can be avoided.

Illustration will be given below to the design proposal of the microstructure 201 with reference to the preferred embodiments.

Embodiment 1

If the curved surface 120 is a spherical curved surface, in order to simplify the manufacturing process and improve the luminous uniformity, the microstructures 201 on the curved surface arranged on the same circumference (for instance, a circle of microstructures 201 arranged along a circumference L1, or a circle of microstructures 201 arranged along a circumference L2) may, as illustrated in FIG. 2b, have a same shape and size. A plane provided with the circumference (e.g., the circumference L1 or L2) is parallel to the light-emitting surface B of the LGP 10.

For instance, the shapes and the sizes of the microstructures 201 respectively disposed on two adjacent circumferences L1 and L2 may be same as each other.

However, as illustrated in FIG. 2b, as for the spherical curved surface 120, the diameter of a cross-section (the cross-section intercepted by a plane parallel to a bottom surface 100 of the mesh point 101) of the spherical surface is gradually expanded from a vertex o' of the spherical curved surface 120 to a center o of a circumference at a low end of the spherical curved surface 120, which indicates that: the perimeter of the cross-section (e.g., the cross-section provided with the circumference L2) close to the low end o of the spherical curved surface 120 is large, and the space for arranging the microstructures 201 is also large; and the perimeter of the cross-section (e.g., the cross-section provided with the circumference L1) close to the vertex o' of the spherical curved surface 120 is small, and the space for arranging the microstructures 201 is also small. Therefore, areas, at which the microstructures 201 can be arranged, of the spherical curved surface 120 become more along the negative direction of the z axis. Therefore, the present disclosure provides another solution for arranging the microstructures 201. Detailed description will be given in the next embodiment.

Embodiment 2

Figure 3:
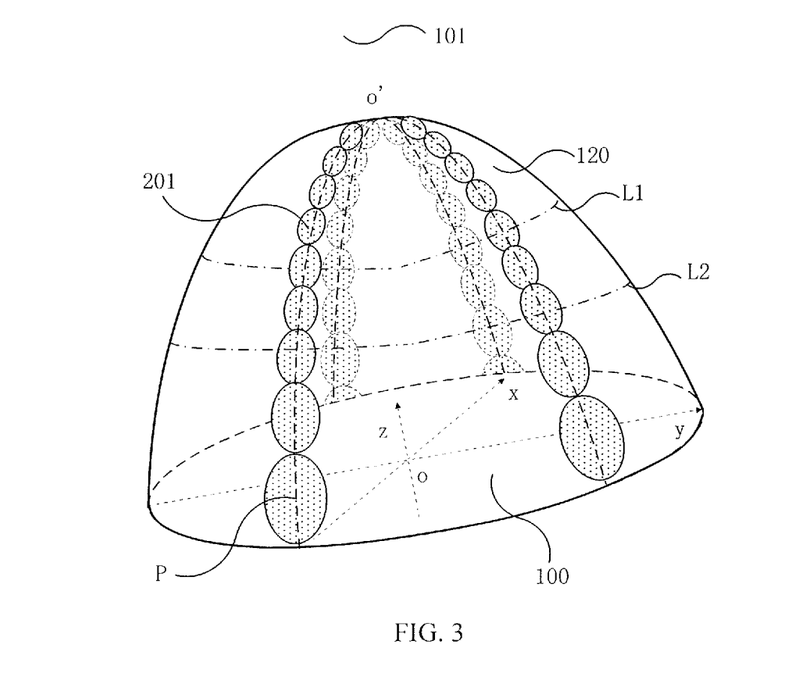
FIG. 3 is a schematic structural view of another mesh point provided by an embodiment of the present disclosure.

As illustrated in FIG. 3, the curved surface 120 may be bisected by N parabolas P; a starting point of the parabola P is the vertex o' of the curved surface 120, and an end point is disposed on the bottom surface 100 of the mesh point 101, wherein N≥1.

As the perimeter of the Cross-section of the spherical curved surface 120 is gradually increased along the negative direction of the z axis and larger microstructures can be arranged, the microstructures 201 are sequentially arranged from the starting point o' to the end point of the parabola and have same shape, and the sizes thereof are gradually increased.

As the mesh point 101 has a very small size, if the microstructures 201 are all manufactured into an equal and small size, the requirements on the manufacturing difficulty and the manufacturing accuracy can be greatly increased. In the above solution, the microstructures 201 with a small size are only required to be manufactured on partial spherical curved surface 120 close to the vertex o'. When the diameter of the cross-section of the spherical curved surface 120 is gradually increased, the sizes of the microstructures 201 are also correspondingly increased. Therefore, the manufacturing accuracy and the manufacturing difficulty can be reduced and the production efficiency can be improved.

Detailed description will be given in the following embodiment to the specific arrangement process of the microstructures 201 on the basis of the size, arrangement and distribution of the microstructures 201 provided by the embodiment 2.

Embodiment 3

As the equation of the parabola P may be $y^2=2Pz$, in which $P=2f$, and f is the focal length of the parabola. As illustrated in FIG. 3, when the parabola P rotates around the z axis for a circle, the spherical curved surface 120 may be obtained.

As seen from the equation of the parabola P, the radius of the cross-section of the spherical curved surface 120 at the origin of coordinate o is $y=\sqrt{2Pz}$.

Supposing that the radius of a cross-section (e.g., a cross-section in which $z \leq f$) is $y_{(i)}$, the perimeter of the cross-section (e.g., the circumference L1) is as follows:

$$C_{(i)}=2\pi y_{(i)}=2\pi\sqrt{2Pz_{(i)}}, i=0,\pm 1,\pm 2,\pm 3$$

If n microstructures 201 may be placed on the circumference L1, the size of each microstructure 201 (when the bottom surface of the microstructure 201 is circular, the size may be referred to diameter) is as follows:

$$\Delta l_{\varphi(i)} = \frac{C_{(i)}}{n} = \frac{2\pi y_{(i)}}{n} = y_{(i)}\Delta\varphi, i = 0, \pm 1, \pm 2, \pm 3 \ldots \quad (1)$$

Therefore, the size (diameter) of each microstructure 201 arranged on the circumference L1 or L2 may be obtained according to the perimeter of the cross-section (e.g., the circumference L1 or L2) on the spherical curved surface 120.

In summary, by adoption of the arrangement method, the bottom surface 203 of the formed microstructure 201 is circular. It should be noted that the shape of the bottom surface 203 of the microstructure 201 refers to the shape of the planar graph of the orthographic projection of the bottom surface 203 of the microstructure 201 towards the curved surface 120.

Figure 4:
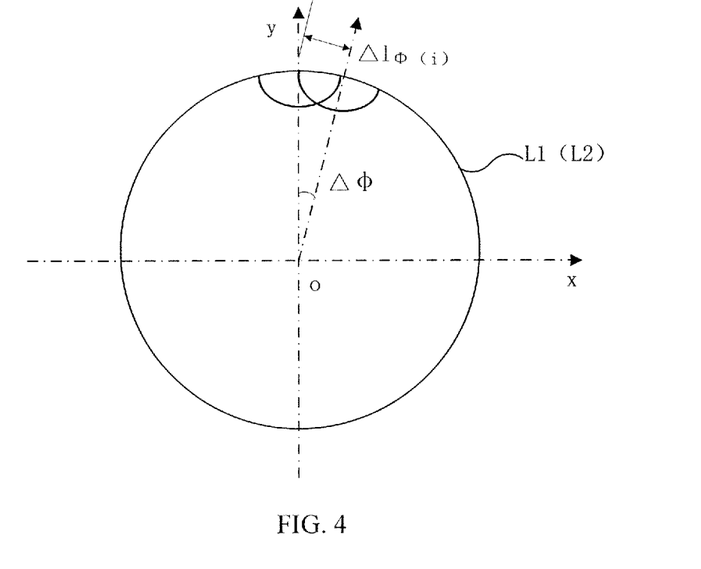
FIG. 4 is a mesh point distribution design diagram provided by an embodiment of the present disclosure.

The shape of the bottom surface 203 of the microstructure 201 may be set to be quadrangle or pentagon. Taking quadrangle as an example, in the arrangement process, as illustrated in FIG. 4, two adjacent microstructures 201, of which the bottom surfaces 203 are circular, arranged on the circumference L1 or L2 may be considered to be overlapped, and overlapped portions are finally required microstructure portions. At this point, the orthographic projection of the bottom surface 203 of the microstructure 201 towards the spherical curved surface 120 is a quadrangle.

In order to adopt the above overlapping method to allow the bottom surface 203 of the microstructure 201 to be a quadrangle or a pentagon, a central position of the microstructure 201 may be intercepted on the spherical curved surface 120 with the curvature radius of R by taking $\Delta l_{\varphi(i)}$ as the radius. When the curvature radius R of the spherical curved surface 120 is larger, the included angle $\Delta\varphi$ between centerlines of two adjacent microstructures 201 is smaller, vice versa.

Figure 5:
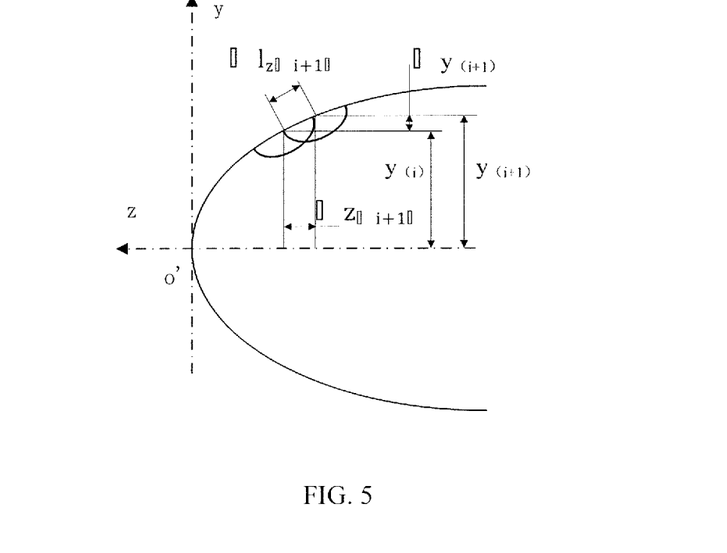
FIG. 5 is another mesh point distribution design diagram provided by an embodiment of the present disclosure.

In addition, as illustrated in FIG. 5, in the arrangement process, after the parabola P is increased by $\Delta z_{(i+1)}$ along the negative direction of the z axis, the length of a generatrix of the parabola P must be increased by $\Delta l_{z(i+1)}$. Therefore, the coordinate $y_{(i)}$ of the microstructure 201 in the y direction is increased by $\Delta y_{(i+1)}$. That is to say, $y_{(i+1)}=y_{(i)}+\Delta y_{(i+1)}$ can be obtained when $\Delta l_{z(i+1)}=\Delta l_{\varphi(i)}$, namely the two adjacent microstructures 201, of which the bottom surfaces 203 are circular, arranged on the circumference L1 or L2 are overlapped with each other.

The following formulas can be obtained from FIG. 5:

$$\Delta l_{z(i+1)}^2=\Delta z_{(i+1)}^2+\Delta y_{(i+1)}^2 \quad (2)$$

$$\Delta z_{(i+1)}^2+\Delta y_{(i+1)}^2=[(y_i+\Delta y_{(i+1)})\Delta\varphi]^2 \quad (3)$$

By taking the derivation of the equation $y^2=2Pz$ of the parabola P, $2ydy=2Pdz$ is obtained; and the following formula is obtained by taking a finite quantity:

$$\Delta y_{(i+1)} = \frac{P}{y_{(i)}}\Delta z_{(i+1)}. \quad (4)$$

The formula (4) is brought into the formula (3) and the following is obtained:

$$\Delta z_{(i+1)}^2 + \left(\frac{P}{y_{(i)}}\Delta z_{(i+1)}\right)^2 = \left[\left(y_{(i)} + \frac{P}{y_{(i)}}\Delta z_{(i+1)}\right)\Delta\varphi\right]^2, \quad (5)$$

and then the formula which the position of the microstructures 201 arranged on the parabola P should satisfy may be obtained:

$$\left[1+\frac{P}{y_{(i)}}(1-\Delta\varphi^2)\right]\Delta z_{(i+1)}^2 - 2P\Delta z_{(i+1)} - y_{(i)}^2\Delta\varphi^2 = 0 \quad (6)$$

wherein P is twice larger than the focal length f of the parabola P; $y_{(i)}$ is the coordinate of the microstructure 201 in the y direction in the coordinate system of the parabola P (as shown in FIG. 5); $\Delta z_{(i+1)}$ is the distance between centerlines of two adjacent microstructures 201 along the z direction in the coordinate system of the parabola P; and $\Delta\varphi$ is an included angle between the centerlines of the two adjacent microstructures 201 on the parabola P.

Moreover, after the focal length f of the parabola P and the coordinate $z_{(i)}$ of the circumference L1 in the z axis are determined, the radius $y_{(i)}$ of the circumference L1 can be obtained. In addition, after the number n of the microstructures 201 required to be arranged on the circumference L1 is determined, the included angle $\Delta\varphi$ between the centerlines of the two adjacent microstructures 201 can be obtained. As $z_{(i+1)}=z_{(i)}\Delta z_{(i+1)}$, the following formula can be obtained by substituting known quantities into the formula (6):

$$\Delta l_{(1)}=\sqrt{\Delta z_{(1)}^2+\Delta y_{(1)}^2}.$$

Moreover, $2ydy=2Pdz$ can be obtained by taking the derivation of the equation $y^2=2Pz$ of the parabola P through the equation (6), and the following formula which is satisfied by the inclination angle $\alpha_{(i)}$ of each microstructure 201 on the parabola P can be obtained:

$$\alpha_{(i)} = \tan^{-1}\frac{P}{y_{(i)}}.$$

Furthermore, the magnification ratio $\beta_{(i)}$ of the two adjacent microstructures 201 satisfies the formula:

$$\beta_{(i)} = \frac{\Delta l_{z(i+1)}}{\Delta l_{\varphi(i)}}$$

wherein $\Delta l_{z(i+1)}$ is the length of the parabola between the centerlines of the two adjacent microstructures along the z direction in the coordinate system of the parabola; and $\Delta l_{\varphi(i)}$ is the diameter of the bottom surface of each microstructure 201.

When the coordinate, the inclination angle and the magnification of the microstructure 201 have all been known, the mesh points 101 provided with the microstructures 201 as shown in FIG. 6 are arranged by the above method. FIG. 6 is a top view of the spherical curved surface 120. And not all the microstructures 201 have been drawn in the drawing.

For instance, when the number of the microstructures 201 on the curved surface 120 of the mesh point 101 is 100, five layers may be arranged and each layer includes 20 microstructures 201. The focal length of the parabola P provided with the microstructures is set to be 5 mm. The specific data of 10 microstructures 201 in the 100 microstructures 201 are as shown in the table 1.

TABLE 1

| Radius of Microstructure (mm) | Magnification Ratio β | Inclination Angle α of Microstructure | Microstructure No. |
|---|---|---|---|
| 0.8886 | 1 | 35.2644 | 1 |
| 0.9214 | 1.03696 | 34.2903 | 2 |
| 0.9546 | 1.03605 | 33.3521 | 3 |
| 0.9882 | 1.03516 | 32.4491 | 4 |
| 1.0221 | 1.03430 | 31.5806 | 5 |
| 1.0563 | 1.03346 | 30.7455 | 6 |
| 1.0908 | 1.03265 | 29.9429 | 7 |
| 1.1256 | 1.03187 | 29.1716 | 8 |
| 1.1606 | 1.03111 | 28.4306 | 9 |
| 1.1958 | 1.03037 | 27.7187 | 10 |

The following data can be obtained by the illumination simulation of the mesh points not provided with the microstructures 201 and the mesh points provided with the microstructures 201 via software.

The data of the LGP 100 comprising the mesh points 101 not provided with the microstructures 201 are as shown in the table 2:

TABLE 2

| Minimum (M) | 242.70 Lux | Contrast Ratio (C) | 0.15720 |
|---|---|---|---|
| Maximum (X) | 333.24 Lux | Standard Deviation (D) | 16.812 |
| Average (A) | 291.83 Lux | Mean Variation (V) | 0.057611 |

The data of the LGP 10 comprising the mesh points 101 provided with the microstructures 201 are as shown in the table 3:

TABLE 3

| Minimum (M) | 263.80 Lux | Contrast Ratio (C) | 0.19239 |
|---|---|---|---|
| Maximum (X) | 389.48 Lux | Standard Deviation (D) | 20.976 |
| Average (A) | 326.93 Lux | Mean Variation (V) | 0.064161 |

In summary, as shown in the table 2, the illumination intensity of the LGP 10 comprising the mesh points 101 not provided with the microstructures 201 is mostly distributed at 300 Lux; and the illumination intensity of the LGP 10, comprising the mesh points 101 provided with the microstructures 201, provided by the embodiment of the present disclosure is mostly distributed at 300 Lux-400 Lux. Therefore, as can be obviously seen, the luminous efficiency of the LGP 10 provided by the embodiments of the present disclosure is improved, and hence the display effect of the display device can be improved.

An embodiment of the present disclosure provides a display device, which comprises any foregoing LGP 10 and has the structure and the advantages same with the LGP 10 provided by the foregoing embodiment. As detailed description has been given to the structure and the advantages of the LGP 10 in the foregoing embodiment, no further description will be given here.

In an embodiment of the present disclosure, the display device may specifically comprise an LCD device. For instance, the display device may be any product or component with display function such as an LCD, an LCD TV, a digital picture frame, a mobile phone and a tablet PC.

The foregoing is only the preferred embodiments of the present disclosure and not intended to limit the scope of protection of the present disclosure. The scope of protection of the present disclosure should be defined by the appended claims The application claims priority to the Chinese patent application No. 201510005708.0, filed Jan. 6, 2015, the disclosure of which is incorporated herein by reference as part of the application.

The invention claimed is:

1. A light guide plate (LGP), comprising at least one mesh point provided with microstructures, wherein all the microstructures on each mesh point are arranged on a same curved surface;
    wherein the curved surface is bisected by N parabolas: a starting point of the parabola is a vertex of the curved surface, and an end point is disposed on a bottom surface of the mesh point: N≥1; and
    the microstructures are sequentially arranged from the starting point to the end point of the parabola and have a same shape, and sizes thereof are gradually increased.

2. The LGP according to claim 1, wherein the curved surface is a spherical curved surface.

3. The LGP according to claim 2, wherein the spherical curved surfaces of all the mesh points on the LGP have a same curvature radius.

4. The LGP according to claim 2, wherein a top surface of the microstructure is a cambered surface.

5. The LGP according to claim 1, wherein a top surface of the microstructure is a cambered surface.

6. The LGP according to claim 1, wherein the microstructures, arranged on a same circumference, on the curved surface have a same shape and size; and a plane provided with the circumference is parallel to a light-emitting surface of the LGP.

7. The LGP according to claim 1, wherein a shape of the bottom surfaces of the microstructures includes quadrangle, pentagon or hexagon.

8. The LGP according to claim 1, wherein positions of the microstructures on the parabola satisfy the formula:

$$\left[1 + \frac{P}{y_{(i)}}(1 - \Delta\varphi^2)\right]\Delta z_{(i+1)}^2 - 2P\Delta z_{(i+1)} - y_{(i)}^2\Delta\varphi^2 = 0$$

wherein P is twice larger than a focal length of the parabola;

$y_{(i)}$ is coordinates of the microstructures in a y direction in a coordinate system of the parabola;

$\Delta z_{(i+1)}$ is a distance between centerlines of two adjacent microstructures along a z direction in the coordinate system of the parabola; and $\Delta\varphi$ is an included angle between the centerlines of the two adjacent microstructures on the parabola.

9. The LGP according to claim 8, wherein an inclination angle $\alpha_{(i)}$ of the microstructure on the parabola satisfies the following formula:

$$\alpha_{(i)} = \tan^{-1}\frac{P}{y_{(i)}}.$$

10. The LGP according to claim 9, wherein a magnification ratio $\beta_{(i)}$ of the two adjacent microstructures satisfies the following formula:

$$\beta_{(i)} = \frac{\Delta l_{z(i+1)}}{\Delta l_{\varphi(i)}}$$

wherein $\Delta l_{z(i+1)}$ is a length of the parabola between the centerlines of the two adjacent microstructures along the z direction in the coordinate system of the parabola; and $\Delta l_{\varphi(i)}$ is a diameter of the bottom surface of each microstructure.

11. The LGP according to claim 1, wherein the curved surface is recessed in the LGP or projected out of the LGP.

12. A display device comprising the LGP according to claim 1.

* * * * *